Nov. 15, 1927.
G. R. HAYMAN
CHIROMETER
Filed Aug. 16, 1924   2 Sheets-Sheet 1
1,648,899
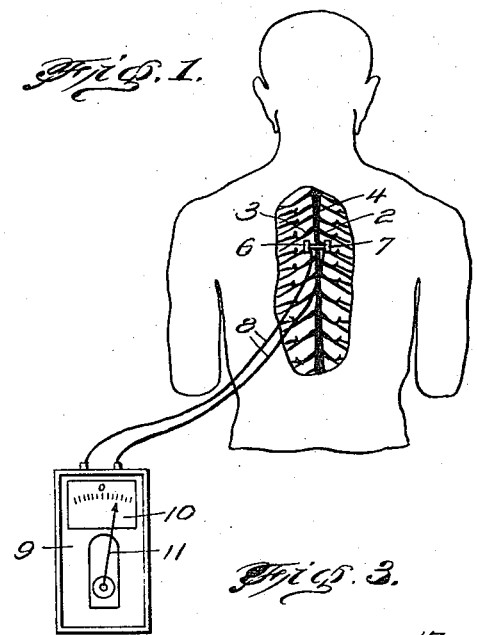
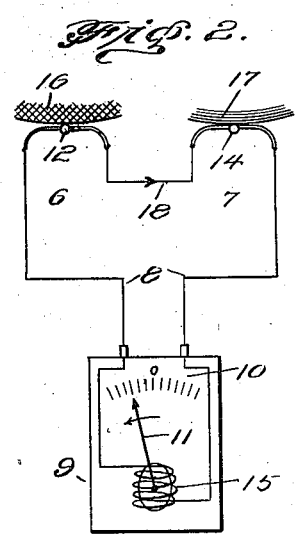
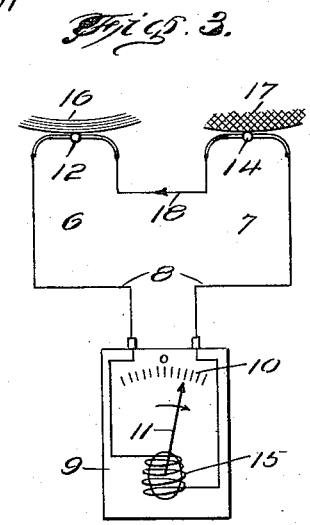
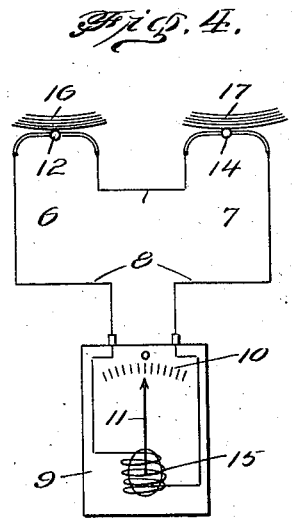
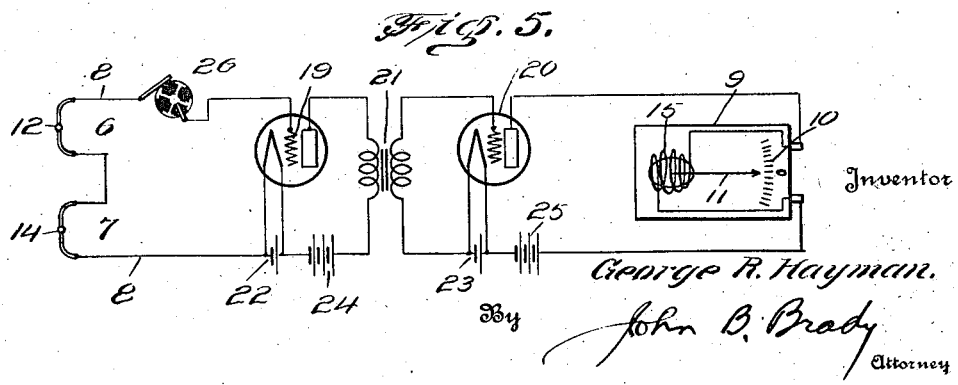
Inventor
George R. Hayman.
By John B. Brady
Attorney Nov. 15, 1927.
G. R. HAYMAN
CHIROMETER
Filed Aug. 16, 1924
1,648,899
2 Sheets-Sheet 2
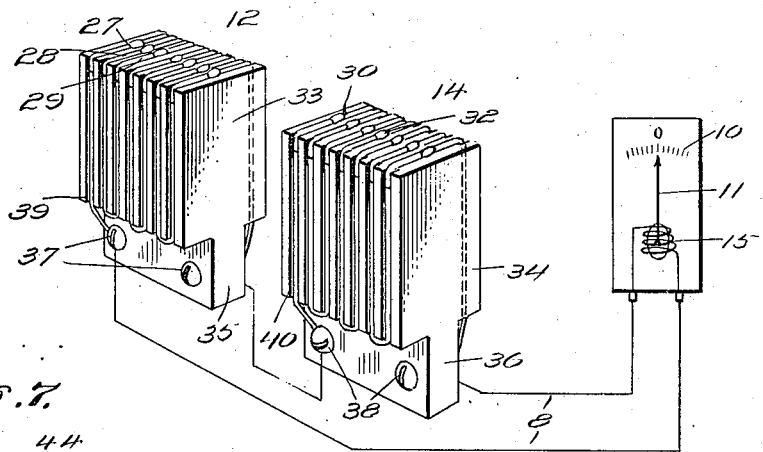
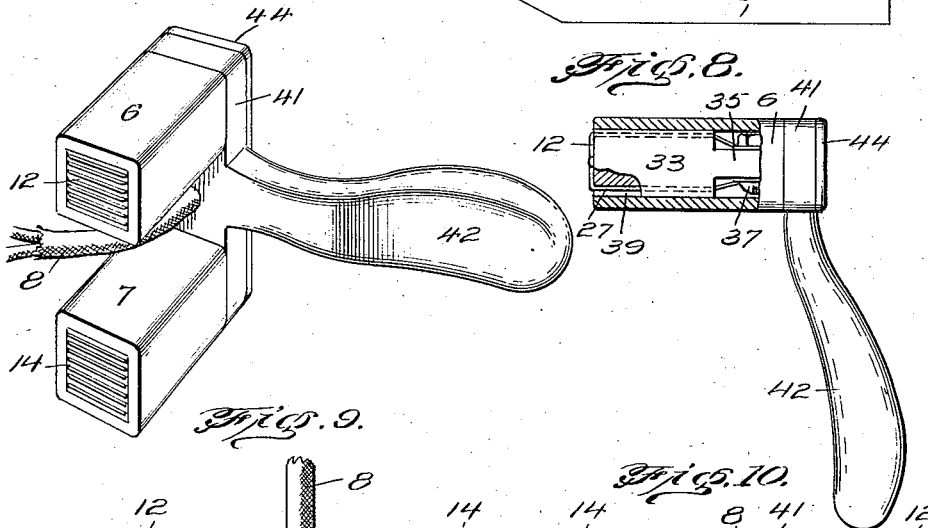
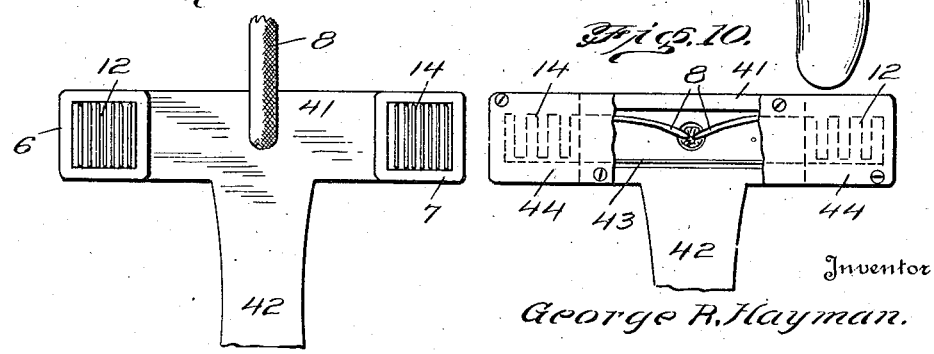
Inventor
George R. Hayman.
By John B. Brady
Attorney Patented Nov. 15, 1927.

1,648,899

UNITED STATES PATENT OFFICE.

GEORGE R. HAYMAN, OF BAY SHORE, NEW YORK, ASSIGNOR TO DASSA DIXON EVINS AND FRANK W. ELLIOTT, OF DAVENPORT, IOWA.

CHIROMETER.

Application filed August 16, 1924. Serial No. 732,582.

My invention relates to a diagnostic instrument or apparatus, and particularly to an instrument or apparatus adapted for analysis or diagnosis by the detection and comparison of heated points upon the human body. It has for one purpose the detection of inflammation or other conditions which cause local increases in temperature, through the detection of the local differences in temperature so set up and the location of the points or areas so heated. A further object of my invention is to provide an applicator embodying a plurality of electrical energy generating devices adapted to contact spaced areas upon the surface of the body and to generate electric energy in proportion to the temperature of the areas with which it is contacted with means for measuring the difference in electrical energy generated by the several devices, whereby the observer may find local differences in temperature.

One application of my invention is the detection of abnormal conditions along the spine, and relating particularly to abnormal conditions, for example pressure upon or inflammations of, the nerves branching from the spine.

Other objects will appear from time to time in the course of the specification and claims.

I illustrate my invention more or less diagrammatically in the accompanying drawings, wherein:—

Figure 1 is a diagrammatic illustration showing the apparatus of my invention as capable of being applied to the various nerve centers along the spinal column; Figs. 2, 3 and 4 illustrate the connection of the apparatus of my invention in a circuit for observing the local conditions of heat upon the body surface; Fig. 5 shows an electrical circuit arrangement associated with the apparatus of my invention for amplifying the effect of body temperature differences upon the meter; Fig. 6 is a partial perspective view showing the arrangement of the energy generating devices and their arrangement in the observing circuit; Fig. 7 is a perspective view of my pistol grip applicator showing the arrangement of thermocouples adapted to be pressed against the body; Fig. 8 is a side view of the pistol grip applicator partially broken away and sectioned to show one of the thermocouple elements therein; Fig. 9 is a plan view looking at the ends of the thermocouples; and Fig. 10 is an opposite end view of the pistol grip applicator with its top plate partially broken away to show the electrical connections within the applicator between the thermocouple elements.

Referring to the drawings reference character 1 designates generally the body of a patient having nerve branches 2 and 3 distributed on opposite sides of the spinal column located within the region 4. The applicator is represented as having electric energy generating devices 6 and 7 which are pressed against the flesh of the patient adjacent the spinal column, and generate energy in response to the heat of that part of the body to which they are applied. These devices are connected by conductors 8 with a sensitive meter 9 herein shown as a galvanometer. The meter is provided with a scale 10 having a central zero position with graduations on either side thereof and an indicator 11 adapted to move over this scale. In Fig. 2 I have illustrated the electric energy generating devices 6 and 7 in the form of thermocouples having junctions 12 and 14, the thermocouples being electrically connected in series and connected to the winding 15 of galvanometer 9 to influence the movement of indicator 11 in either direction over scale 10 in accordance with the direction of current in the circuit. In Fig. 2 the body of the patient is represented as having a high temperature on the left side as indicated at 16 and a normal temperature on the opposite side as indicated at 17. Under this condition the current will pass in a direction indicated by arrow 18 and the indicator 11 will swing over scale 10 toward the left or in the direction of the high temperature. Fig. 3 shows a condition where a high temperature exists on the right hand side represented at 17 while normal temperature exists on the left hand side at 16. Under this condition thermocouple 14 will be heated while thermocouple 12 remains cool and the passage of current in the circuit will be in the opposite direction as indicated by arrow 18 of Fig. 2 and meter 9 will have its indicator 11 swung over in the right hand direction or in the direction of the high temperature. In Fig. 4 I have shown a condition where the temperature at positions 16 and 17 is normal in which case the indicator 11 remains substantially on the zero mark for the reason that negligible electromotive force is generated in the thermocouples 12 and 14. In order to increase the effect of the minute energy generated by the thermocouples 12 and 14 I may employ an amplification system connected between the thermocouple circuit and the meter. The amplification system may comprise a plurality of electron tubes 19 and 20 having their input and output circuits inductively coupled by transformer 21. The cathodes for the tubes may be supplied from any suitable source of energy designated at 22 and 23 and the anodes may be energized from suitable sources of high potential represented at 24 and 25. A form of chopper 26 may be provided in the input circuit of the first amplification tube 19 to place an intermittent current as developed by thermocouples 12 and 14 upon the input circuit of the amplifier. The meter 9 has its winding 15 connected in the output circuit of the amplifier so that indicator 11 will be moved in either direction over scale 10. The provision of the amplification system in circuit with the thermocouples of the meter enables observations of more minute variations in temperature than is possible without the sensitive amplifying means. The construction of the thermocouples 12 and 14 is more clearly represented in the perspective view of Fig. 6. The thermocouple unit 12 comprises a plurality of elements 27, 28, 29 etc. and the thermocouple unit 14 comprises thermocouple elements 30, 32 etc. The elements are supported on substantially rectangular blocks 33 and 34. Each block has an extension 35 and 36 respectively, the extensions being substantially shorter than the length of the blocks proper and having substantially the same width as the blocks on one side but less than the width of the blocks on its other side to provide a space for the securing of binding posts 37 and 38 respectively. The blocks 33 and 34 are provided with longitudinal grooves 39 and 40 respectively upon the sides of the blocks. The thermocouple elements 27, 28, and 29, and 30, 31 and 32 comprise junctions of dissimilar metals such as copper and silver centered along the top of each of the blocks in a position to readily contact with the body of the patient. The thermocouples 12 and 14 are connected in series with meter 9 as heretofore described.

Figs. 7 to 10 represent the pistol grip applicator by which the thermocouples are pressed into engagement with the body. The square arms 6 and 7 of the applicator are supported by a back member 41 to which is secured substantially at right angles to the direction of the arms 6 and 7 the pistol grip 42. The block 33 of thermocouple unit 12 is shown in Fig. 8 as extending into arm 6 with the extension 35 carrying binding post 37 forming the terminals for the thermocouple unit whereby the units 12 and 14 may be electrically connected in series by a conductor 43 represented in Figure 10. A rear plate 44 fits over the back member 41 compactly housing the wiring extending from each of the thermocouple units 12 and 14. Conductors 8 lead from beneath the back member 41. It will be understood that the thermocouple units 12 and 14 are centered one with respect to the other in proportion to the distance between the nerve branches in the spinal column whereby each of the thermocouples may be pressed firmly against the patient in the proper location. It will be understood that the energy impressed upon the observing meter by my arrangement of thermocouples is proportioned to the difference of the energy generated by each of the thermocouples. That is to say one of the thermocouples may acquire a high positive resistance by reason of the cooling effect imparted to the elements of the thermocouple by pressing the thermocouple unit against the body of the patient. At the same time the other thermocouple unit may acquire a high negative resistance due to the heating effect imparted to the several elements by reason of the contact with a hot box in the body. The resulting energy delivered to the observing circuit will be directly proportional to the difference in the resistances of the thermocouple units. By reason of the square end section of the thermocouple units I am enabled to place the units firmly against the body of the patient so that the temperature of the thermocouple units becomes the same as that of the nerve branches.

While I have described my invention in certain particular embodiments I desire that it be understood that no limitations upon the invention are intended other than those imposed by the scope of the appended claims.

What I claim and desire to secure by Letters Patent of the United States is as follows:

1. An apparatus for temperature observation comprising in combination a hand applicator, a pair of arms carried by said applicator and a thermo-electric generator disposed in each of said arms, said arms being spaced apart for a distance proportioned to the distance between nerve branches on opposite sides of the spinal column and a pistol grip extending substantially at right angles to said arms whereby said thermo-electric generators may be pressed firmly in contact with the body of a patient.

2. An apparatus for temperature observation comprising in combination a hand applicator, a pair of arms carried by said applicator and a thermo-electric generator disposed in each of said arms and adapted to contact with the body of a patient, each of said generators comprising a plurality of junctions terminating in a substantially rectangular end section for securing a firm contact with the body on opposite sides of the spinal column.

3. An apparatus for temperature observation comprising in combination a hand applicator, a pair of substantially rectangular tubular arms carried by said applicator, and a thermo-electric generator comprising a plurality of junctions disposed within each of said tubular arms, said arms being spaced apart for a distance proportioned to the distance between nerve branches on opposite sides of the spinal column and a pistol grip extending substantially at right angles to said arms whereby said thermo-electric generators may be pressed firmly in contact with the body of a patient.

4. An apparatus for temperature observation comprising a hand applicator having a bridge member, a hand grip extending at right angles to the center of said bridge member substantially in the plane thereof, a pair of tubular members extending substantially at right angles to the plane of said bridge member and on opposite ends thereof at a distance spaced one from the other corresponding to the distance between nerve branches on opposite sides of the spinal column, each of said tubular members forming housings for thermo-electric generators arranged to be placed against the body of a patient whereby said generators operate to produce electrical energy in proportion to the temperature of selected portions of the body adjacent the spine.

GEORGE R. HAYMAN.